Oct. 14, 1924.
G. MACKENZIE, JR
WHEEL FOR TRACTORS AND THE LIKE
Filed April 2, 1924
1,511,293
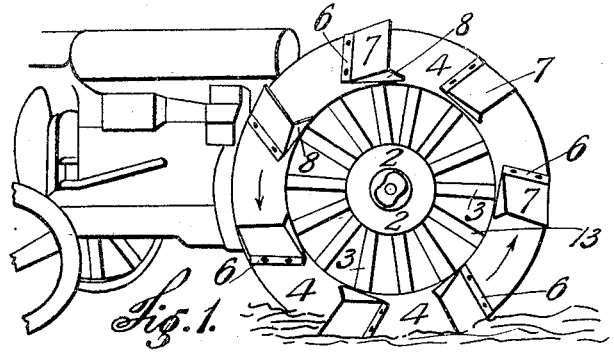
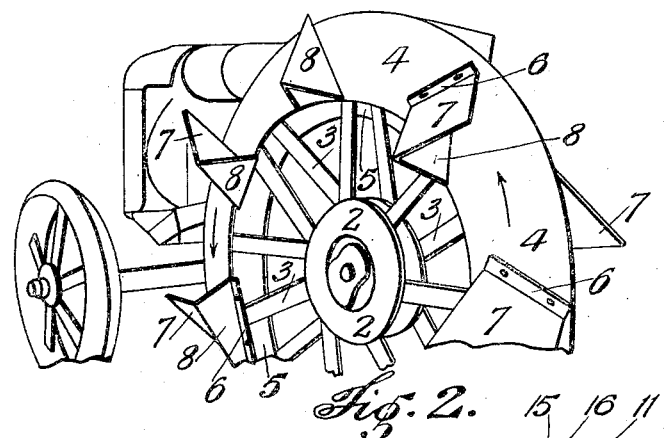
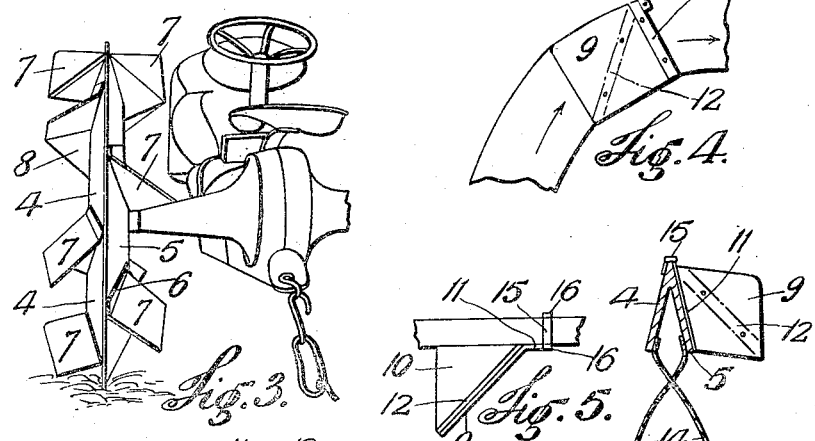

Patented Oct. 14, 1924.

1,511,293

UNITED STATES PATENT OFFICE.

GOTTHILF MACKENZIE, JR., OF GEELONG, VICTORIA, AUSTRALIA.

WHEEL FOR TRACTORS AND THE LIKE.

Application filed April 2, 1924. Serial No. 703,743.

*To all whom it may concern:*

Be it known that I, GOTTHILF MACKENZIE, Junior, a subject of the King of Great Britain and Ireland, residing at 37 Autumn Street, Geelong, in the State of Victoria, Commonwealth of Australia, farmer, have invented new and useful Improvements in Wheels for Tractors and the like, of which the following is a specification.

This invention relates to vehicle wheels particularly applicable to farm tractors and the like, and has for its object to provide a wheel that will move with comparative freedom over muddy, soft, loose or sticky ground and will not become bogged therein. The invention, further aims at providing a wheel, light in weight without sacrificing strength, and which is of simple and comparatively cheap construction particularly adapted to the heavier work of farm tractors to lighten the draft thereof. Other objects and advantages will become apparent from the following description and accompanying drawings:—

Figure 1 is a side elevation showing portion of a tractor having this invention applied thereto.

Figure 2 is a perspective view, on a larger scale, of portion of a tractor having this invention applied thereto.

Figure 3 is a rear perspective view, on a reduced scale, of portion of a tractor having this invention applied thereto.

Figure 4 is a broken side elevation of the wheel rim showing a modified form of grip.

Figure 5 is a plan of Figure 4.

Figure 6 is a sectional view of a modified wheel and grip.

Figure 7 is a side elevation of a caterpillar or link type of tractor belt having grips applied thereto, according to this invention.

Figure 8 is a transverse sectional view through one of the links of Figure 7.

The wheel consists of a hub 2 from which radiate spokes 3 secured at their outer ends to a rim of approximate V cross-section having an outer portion 4 and an inner portion 5. The outer and inner portions 4 and 5 may be cast integral or they may be separate and be bolted or otherwise secured together, or the rim may also be formed of segments bolted or otherwise secured together. In the drawings the inner and outer portions of the rim have been shown integral. The rim presents a knife edge or the minimum bearing surface to the ground.

Secured by bolts or the like to the outer portion 4 and to the inner portion 5 of the rim is a series of bearing grips or members. Each grip is provided with a flange 6 and an outwardly inclined portion 7. The grips are secured by bolts or the like passing through the flange. Between the portion 7 and the rim is a flange 8. The grips may have the portions thereof formed integral.

The grips upon each side or portion of the rim are spaced equal distances apart but are not oppositely located. The grips on one portion of the rim are located in the spaces between the grips on the other portion of the rim. The forward ends of the grips on one portion of the rim commence approximately at or slightly ahead of the trailing or rear ends of the grips on the other or opposite portion of the rim.

In Figures 1, 2 and 3 of the drawings a wheel has been shown in which the rim is a casting and in which each of the grips is a casting. The flange 8 of each grip is shown located at one side thereof. In Figures 4, 5 and 6 a grip is shown comprising two separate members 9 and 10. The member 9 is provided with a flange 11 by which it is bolted or otherwise secured to the wheel rim and is inclined outwardly or diagonally disposed in relation thereto. The member 10 is bolted or otherwise secured by a flange 12 to the member 9 between it and the rim, and is inclined or diagonally disposed in relation to the said member 9. In Figures 4, 5 and 6 the outer and inner members 4 and 5 of the rim have been shown integral but they may obviously be separate and bolted or otherwise secured together. The rim, further, is shown as consisting of an inner hub ring 13 of channel cross section united to the members 4 and 5 by intermediate elements 14 which may be bolted or otherwise suitably secured in position.

In any of its forms or embodiments a lateral stop 15 may be located ahead of each grip. Each stop 15 may be provided with side flanges 16 by which it is bolted or otherwise secured in position. The function of the stops 15 is to prevent skidding of the rim upon tree stumps or the like.

Figures 7 and 8 show the grip seen in Figures 4 to 7 applied to the chain, link or caterpillar type of tractor belt. In applying the invention to the linked belt type of vehicle drive the links 17 are preferably of V or approximate V cross section as shown, to present a knife edge to the ground.

It may be mentioned, however, that the wheel illustrated in the drawings has proven satisfactory. In practice it has been found that the ground is not unnecessarily broken up, slipping is reduced to a minimum, the least possible bearing surface is used, and the ground is not packed in a pathway or a track formed by the passage of the invention over it. Further, the invention is not limited to the driving wheels of tractors but may be applied to the steering wheels also, for example. Tractors having the caterpillar type of drive may also be equipped with the invention as hereinbefore shown.

Having now fully described and ascertained my said invention and the manner in which it is to be performed, I declare that what I claim is:—

1. In combination with a ground engaging element of approximately V-form in cross section, of a grip projecting outwardly from and inclined with relation to said element, and a flange arranged between the grip and element.

2. A tractor wheel having a rim of V-form in cross section, a grip projecting outwardly from one of the walls of the rim, said grip being at an inclination to the surface of said wall and also at an inclination to the radial line of the wheel.

3. A tractor wheel having a rim of V-form in cross section, a grip projecting outwardly from one of the walls of the rim, said grip being at an inclination to the surface of said wall and also at an inclination to the radial line of the wheel, and a flange between one edge of the grip and the wall of the wheel rim.

In testimony whereof I have signed my name to this specification.

Dated this fourth day of February, 1924.

GOTTHILF MACKENZIE, Jr.

Witnesses:
Thomas L. Price,
S. R. Bumpstead.